US009702697B2

United States Patent
Stewart et al.

(10) Patent No.: US 9,702,697 B2
(45) Date of Patent: Jul. 11, 2017

(54) BIAS AND SCALE-FACTOR ERROR MITIGATION IN A CORIOLIS VIBRATORY GYROSCOPE SYSTEM

(71) Applicants: Robert E. Stewart, Woodland Hills, CA (US); David M. Rozelle, Woodland Hills, CA (US); Charles A. Lee, Camarillo, CA (US)

(72) Inventors: Robert E. Stewart, Woodland Hills, CA (US); David M. Rozelle, Woodland Hills, CA (US); Charles A. Lee, Camarillo, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 165 days.

(21) Appl. No.: 14/618,726

(22) Filed: Feb. 10, 2015

(65) Prior Publication Data
US 2016/0231112 A1 Aug. 11, 2016

(51) Int. Cl.
*G01C 19/56* (2012.01)
*G01C 19/5677* (2012.01)
(Continued)

(52) U.S. Cl.
CPC ..... *G01C 19/5677* (2013.01); *G01C 19/5684* (2013.01); *G01C 19/5691* (2013.01); *G01C 19/5776* (2013.01); *G01C 25/00* (2013.01)

(58) Field of Classification Search
CPC ............ G01C 19/5677; G01C 19/5776; G01C 19/5733; G01C 19/5705; G01C 19/5726;
(Continued)

(56) References Cited

U.S. PATENT DOCUMENTS 5,383,362 A * 1/1995 Putty ................. G01C 19/5691
73/504.01
5,712,427 A * 1/1998 Matthews .......... G01C 19/5691
73/1.37
(Continued)

FOREIGN PATENT DOCUMENTS

WO WO 2010/024729 A2 3/2010

OTHER PUBLICATIONS

European Search Report for corresponding EP 16 15 4922 dated Jun. 27, 2016.

*Primary Examiner* — Helen Kwok
(74) *Attorney, Agent, or Firm* — Tarolli, Sundheim, Covell & Tummino LLP (57) ABSTRACT

One embodiment of the invention includes a CVG system. A plurality of electrodes electrostatically force a resonator into a periodic motion based on a drive axis forcer signal applied to a first set of the plurality of electrodes and a sense axis force-rebalance signal applied to a second set of the plurality of electrodes, and provides a sense axis pickoff signal and a drive axis pickoff signal. A gyroscope controller generates the drive axis forcer signal based on the drive axis pickoff signal and calculates an angular rate of rotation about an input axis based on the sense axis force-rebalance signal. The gyroscope controller modulates a predetermined disturbance signal component onto the sense axis force-rebalance signal and to control a modulation phase of the sense axis force-rebalance signal based on detection of the predetermined disturbance signal component in the sense axis force-rebalance signal to substantially mitigate bias and scale-factor error.

20 Claims, 3 Drawing Sheets

(51) Int. Cl.
*G01C 25/00* (2006.01)
*G01C 19/5684* (2012.01)
*G01C 19/5691* (2012.01)
*G01C 19/5776* (2012.01)

(58) Field of Classification Search
CPC ............. G01C 19/5755; G01C 19/574; G01C 19/5691; G01C 19/5684
USPC .................................. 73/504.13, 1.37, 1.77
See application file for complete search history.

(56) References Cited

U.S. PATENT DOCUMENTS

| | | | | |
|---|---|---|---|---|
| 7,123,111 B2* | 10/2006 | Brunson | ............ | G01C 19/5684 331/116 M |
| 7,240,533 B2* | 7/2007 | Fell | .................... | G01C 19/5677 73/1.38 |
| 7,246,512 B2* | 7/2007 | Schroeder | .............. | G01C 25/00 33/318 |
| 7,318,347 B2 | 1/2008 | Lynch et al. | | |
| 7,337,665 B2 | 3/2008 | Schroeder | | |
| 7,874,209 B2* | 1/2011 | Stewart | .............. | G01C 19/5698 73/1.37 |
| 2004/0088127 A1* | 5/2004 | M'Closkey | ............ | G01C 19/56 702/96 |
| 2005/0279155 A1* | 12/2005 | Schroeder | .............. | G01C 19/56 73/1.37 |
| 2009/0173157 A1* | 7/2009 | Stewart | .............. | G01C 19/5698 73/504.13 |
| 2011/0192226 A1 | 8/2011 | Hayner et al. | | |
| 2015/0192415 A1* | 7/2015 | Ge | .................... | G01C 19/5776 73/504.13 |

* cited by examiner

BIAS AND SCALE-FACTOR ERROR MITIGATION IN A CORIOLIS VIBRATORY GYROSCOPE SYSTEM

TECHNICAL FIELD

This disclosure relates generally to sensor systems, and specifically to bias and scale-factor error mitigation in a Coriolis vibratory gyroscope system.

BACKGROUND

There are a number different types of gyroscope systems that are configured to calculate rotation about a sensitive (e.g., input) axis. One type of gyroscope is a Coriolis vibratory gyroscope (CVG). One example of a CVG is a tuning fork gyroscope in which two masses (e.g. tines) can vibrate in plane along a drive axis. In response to an applied angular rate about an input axis parallel to the tines of the tuning fork, Coriolis forces cause the tines to vibrate out of plane along a sense axis (e.g., 90° relative to a drive axis). The amplitude of the out-of-plane motion in open loop instruments or the force required to rebalance and null the out-of-plane motion in closed-loop instruments can correspond to a measure of the angular rate applied about the input axis.

Another example of a CVG is a Hemispheric Resonator Gyroscope (HRG) in which a "wine glass" shaped resonator is caused to vibrate at a fundamental (e.g., n=2) resonant frequency along a drive axis. An angular rotation applied about the axis of symmetry of the resonator (e.g., input axis) can cause the vibration pattern to lag in angular displacement relative to the housing. The angular displacement of the vibration pattern angle of the resonator relative to the housing in an open loop operation (e.g., whole angle) can be a measure of the angular displacement of the gyroscope. In a closed loop operation (e.g., force-rebalanced), the vibration pattern can be maintained fixed with respect to the housing. The force required to null the vibration along the sense axis (e.g., 45° relative to the drive axis) can be proportional to the angular rate applied about the input axis.

SUMMARY

One embodiment of the invention includes a CVG system. A plurality of electrodes electrostatically force a resonator into a periodic motion based on a drive axis forcer signal applied to a first set of the plurality of electrodes and a sense axis force-rebalance signal applied to a second set of the plurality of electrodes, and provides a sense axis pickoff signal and a drive axis pickoff signal. A gyroscope controller generates the drive axis forcer signal based on the drive axis pickoff signal and calculates an angular rate of rotation about an input axis based on the sense axis force-rebalance signal. The gyroscope controller modulates a predetermined disturbance signal component onto the sense axis force-rebalance signal and to control a modulation phase of the sense axis force-rebalance signal based on detection of the predetermined disturbance signal component in the sense axis force-rebalance signal to substantially mitigate bias and scale-factor error.

Another embodiment of the invention includes a method for substantially mitigating bias and scale-factor errors in a CVG. The method includes generating a drive axis forcer signal based on a drive axis pickoff signal provided via a first set of electrodes. The method also includes providing the drive axis forcer signal to the first set of electrodes to electrostatically force a resonator into a substantially periodic motion and generating a sense axis force-rebalance signal based on a sense axis pickoff signal provided via a second set of electrodes. The sense axis force-rebalance signal comprising a quadrature component, a bias component, a rate component, and a predetermined disturbance signal component. The method also includes providing the sense axis force-rebalance signal to the second set of electrodes to electrostatically force-rebalance deformation of the substantially periodic motion based on quadrature effects, bias, and angular rotation rate of the CVG system. The method also includes determining a rate of angular rotation about an input axis of the CVG based on the rate component of the sense axis force-rebalance signal. The method further includes controlling a modulation phase of the quadrature component and the rate component of the sense axis force-rebalance signal based on detection of the predetermined disturbance signal component in the rate component of the sense axis force-rebalance signal.

Another embodiment of the invention includes a CVG system. The system includes a sensor system comprising a plurality of electrodes configured to electrostatically force a resonator into a substantially periodic motion based on a drive axis forcer signal and a sense axis force-rebalance signal. The sense axis force-rebalance signal includes a bias component, a rate component, and a quadrature component, and is configured to provide a sense axis pickoff signal and a drive axis pickoff signal. The system also includes a gyroscope controller. The gyroscope controller includes a signal generator configured to generate the drive axis forcer signal and the sense axis force-rebalance signal each at a first frequency and a predetermined disturbance signal component at a second frequency less than the first frequency, and to modulate the predetermined disturbance signal component onto the quadrature component of the sense axis force-rebalance signal. The gyroscope controller also includes at least one demodulator configured to demodulate the sense axis pickoff signal and the drive axis pickoff signal. The gyroscope controller also includes a processor configured to calculate an angular rate of rotation of the CVG system about an input axis based on the rate component of the sense axis force-rebalance signal. The gyroscope controller further includes a phase controller configured to detect a modulation phase error of the rate component and the quadrature component of the sense axis force-rebalance signal based on detection of the predetermined disturbance signal component in the demodulated rate component of the sense axis force-rebalance signal and to adjust the modulation phase of the rate component and the quadrature component to substantially mitigate bias and scale-factor errors.

DETAILED DESCRIPTION

This disclosure relates generally to sensor systems, and specifically to bias and scale-factor error mitigation in a Coriolis vibratory gyroscope (CVG) system. A CVG can include a sensor and a gyroscope controller. The gyroscope controller includes a signal generator that can generate a drive axis forcer signal based on a drive axis drive axis pickoff signal and a sense axis force-rebalance signal based on a sense axis sense axis pickoff signal. The drive axis forcer signal is provided to a first set of electrodes of the sensor to maintain a periodic motion of an annular resonator of the sensor, the first set of electrodes generating the drive axis drive axis pickoff signal. The sense axis force-rebalance signal can include a rate component that is configured to provide force-rebalance of deformation of the annular resonator resulting from bias and angular rotation of the CVG system and a quadrature component that can provide force-rebalance of quadrature effects. The sense axis force-rebalance signal can be provided to a second set of electrodes of the sensor to force-rebalance quadrature effects and deformation of the annular resonator based on bias and angular rotation about an input axis of the sensor, the second set of electrodes generating the sense axis sense axis pickoff signal.

The gyroscope controller is configured to calculate an angular rate of rotation of the sensor about the input axis based on the rate component of the sense axis force-rebalance signal. For example, the gyroscope controller can include a demodulator system that can demodulate the sense axis sense axis pickoff signal at a frequency that is approximately equal to the drive axis forcer signal. The demodulated sense axis sense axis pickoff signal can include a rate component, a bias component and a quadrature component. In addition, the gyroscope controller can include a phase controller configured to control the modulation phase of the rate component and quadrature component to substantially mitigate bias and scale-factor errors resulting from coupling of the quadrature component into the rate component and angular rate component into the quadrature component. As an example, the signal generator can be configured to inject a predetermined disturbance signal component into the quadrature component, and the demodulator system can further demodulate the rate component, such that the phase controller can detect the presence of the predetermined disturbance signal component in the rate component of the sense axis force-rebalance signal. In response to detecting the presence of the predetermined disturbance signal component in the rate component of the sense axis force-rebalance signal, and thus coupling of the quadrature component in the rate component, the phase detector can adjust the modulation phase of the quadrature component and rate component to substantially remove the coupling. Accordingly, bias and scale-factor errors resulting from the coupling of the quadrature force-rebalance signal into the rate signal and rate signal into the quadrature signal can be substantially mitigated.

Figure 1:
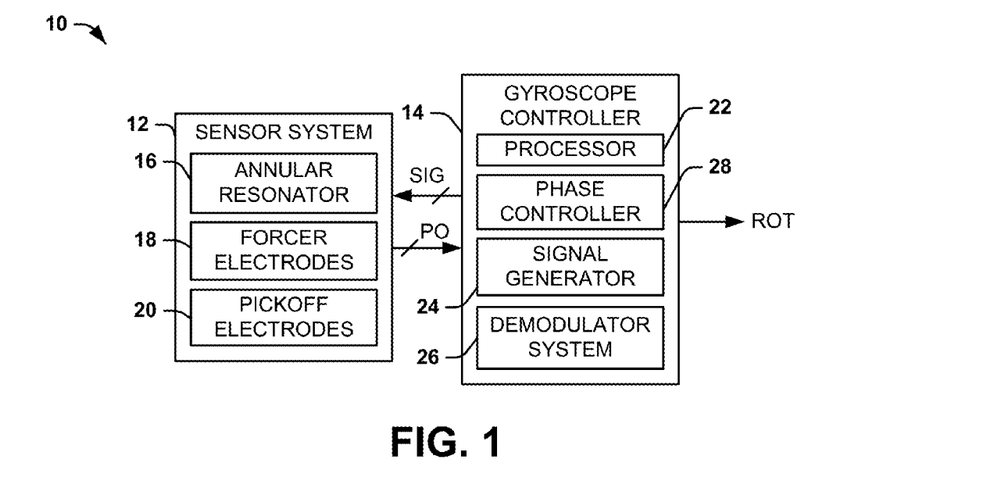
FIG. 1 illustrates an example of a Coriolis vibratory gyroscope (CVG) system.

FIG. 1 illustrates an example of a Coriolis vibratory gyroscope (CVG) system 10. The CVG system 10 can be implemented in any of a variety of applications with which accurate measurement of rotation may be necessary, such as aerospace and nautical navigation. The CVG system 10 includes a sensor system 12 and a gyroscope controller 14.

The sensor system 12 includes an annular resonator 16 that can be arranged as a deformable material having an elastic property and being provided in one of a variety of different forms. For example, the annular resonator 16 can be an elastic ring or an elastic hemisphere. The sensor system 12 also includes a set of forcer electrodes 18 and a set of pickoff electrodes 20 that are arranged internally with respect to the annular resonator 16, such that the annular resonator 16 substantially surrounds the sets of forcer and pickoff electrodes 18 and 20. The forcer electrodes 18 are configured to generate electrostatic force in response to signals SIG provided by the gyroscope controller 14 to provide deformation of the annular resonator 16, such as to provide a periodic motion of the annular resonator 16 and to provide force-rebalance of deformation of the annular resonator 16. For example, the force-rebalance of the annular resonator 16 can be based on quadrature effects and to force-rebalance deformation due to angular rotation of the sensor system 12 about an input axis, as described in greater detail herein. The pickoff electrodes 20 can provide pickoff signals PO corresponding to the motion of the annular resonator 16, such as to control a magnitude of the signals SIG that are provided to the forcer electrodes 18. While the example of FIG. 1 demonstrates that the forcer electrodes 18 and the pickoff electrodes 20 are separate and distinct with respect to each other, it is to be understood that the sensor system 12 could incorporate a set of electrodes that each implement dual forcer and pickoff functionality.

The gyroscope controller 14 includes a processor 22, a signal generator 24, and a demodulator system 26. The signal generator 24 is configured to generate the signals SIG that are provided to the forcer electrodes 18 based on the pickoff signals PO that are provided to the processor 22. As an example, the signals SIG that are generated by the signal generator 24 can include a drive axis forcer signal $SIG_{AN}$ and a sense axis force-rebalance signal $SIG_N$. The drive axis forcer signal can be provided to a first portion of the forcer electrodes 18 aligned along an anti-nodal axis to provide the periodic motion of the annular resonator 16 in response to one of the pickoff signals PO corresponding to a drive axis pickoff signal $PO_{AN}$. The sense axis force-rebalance signal $SIG_N$ can be provided to a second portion of the forcer electrodes 18 aligned along a sense axis (e.g., nodal axis) to provide force-rebalance of quadrature effects and deformation of the annular resonator 16 resulting from bias and angular rotation of the sensor system 12 in response to another one of the pickoff signals PO corresponding to a sense axis pickoff signal $PO_N$. The sense axis pickoff signal $PO_N$ can be provided to the processor that generates the forcer rebalance signal $SIG_N$ that can have a magnitude that is indicative of bias, the rate of angular rotation of the sensor system 12 about an input axis, and quadrature effects. Thus, the gyroscope controller 14 can provide the measurement of the angular rate of rotation about the input axis as an output signal ROT. In addition, as described in greater detail herein, the signal generator 24 can be configured to modulate a predetermined disturbance signal component into the quadrature component of the sense axis force-rebalance signal of the signals SIG to substantially mitigate bias and scale-factor errors resulting from coupling of quadrature effects onto a rate signal and the rate signal into the quadrature signal.

Figure 2:
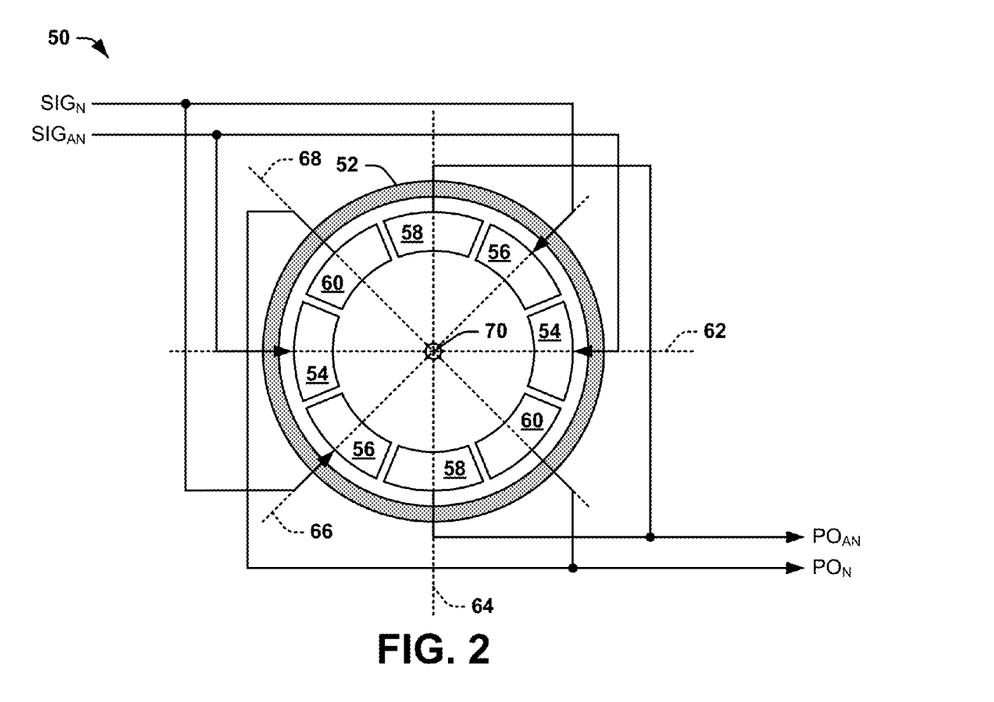
FIG. 2 illustrates an example of a sensor system.

FIG. 2 illustrates an example of a sensor system 50. The sensor system 50 can correspond to the sensor system 12 in the example of FIG. 1. Therefore, reference is to be made to the example of FIG. 1 in the following description of the example of FIG. 2.

The sensor system 50 includes an annular resonator 52 that substantially surrounds a plurality of electrodes. As an example, the annular resonator 52 can be configured as an elastic ring or an elastic hemisphere. The plurality of electrodes includes a pair of oppositely-disposed anti-nodal forcer electrodes 54, a pair of oppositely-disposed sense axis nodal force-rebalance electrodes 56, a pair of oppositely-disposed anti-nodal pickoff electrodes 58, and a pair of oppositely-disposed nodal pickoff electrodes 60. The pair of oppositely-disposed anti-nodal forcer electrodes 54 are arranged along an anti-nodal forcer axis 62 and the pair of oppositely-disposed anti-nodal pickoff electrodes 58 are arranged along an anti-nodal pickoff axis 64 that is oriented orthogonally with respect to the anti-nodal forcer axis 62. Similarly, the pair of oppositely-disposed sense axis nodal force-rebalance electrodes 56 are arranged along a nodal force-rebalance axis 66, arranged 45° with respect to the anti-nodal forcer and pickoff axes 62 and 64, and the pair of oppositely-disposed nodal pickoff electrodes 60 are arranged along a nodal pickoff axis 68 that is oriented orthogonally with respect to the nodal force-rebalance axis 66. As described herein, the terms "drive axis" and "anti-nodal axis" are used interchangeably, and the terms "sense axis" and "nodal axis" are used interchangeably. As also described herein, the term "oppositely-disposed" with respect to the electrodes refers to a given pair of electrodes being arranged opposite an input axis 70 of the sensor system 50, which is thus orthogonal to the axes 62, 64, 66, and 68, and is thus an approximate center point of the annular resonator 52. Therefore, a given one of the oppositely-disposed pairs of electrodes 54, 56, 58, and 60 are all substantially symmetric about the input axis 70 of the sensor system 50 about which an angular rotation is measured.

The anti-nodal forcer electrodes 54 are each concurrently provided a drive axis forcer signal $SIG_{AN}$, with the forcer signal $SIG_{AN}$ being provided at a frequency that is approximately equal to a resonant frequency of the annular resonator 52 (e.g., approximately 4 kHz). In response, the anti-nodal forcer electrodes 54 can provide an electrostatic force that acts upon the annular resonator 52. In response, the annular resonator 52 is electrostatically attracted to the anti-nodal forcer electrodes 54 substantially equally and oppositely along the anti-nodal forcer axis 62 and is expanded substantially equally and oppositely away from the anti-nodal pickoff electrodes 58 along the anti-nodal pickoff axis 64. The state of the annular resonator 52 in response to the application of the drive axis forcer signal $SIG_{AN}$ is demonstrated at 100 in the example of FIG. 3.

Due to the elastic property of the annular resonator 52, the annular resonator 52 can rebound at approximately half of a period of the resonant frequency. In response, the annular resonator 52 contracts away from the anti-nodal forcer electrodes 54 substantially equally and oppositely along the anti-nodal forcer axis 62, achieving a maximum velocity at the state demonstrated in the example of FIG. 2, and expanding substantially equally and oppositely towards the anti-nodal pickoff electrodes 58 along the anti-nodal pickoff axis 64. The rebound state of the annular resonator 52, approximately 180° of a given period of the anti-nodal forcer $SIG_{AN}$, is demonstrated at 102 in the example of FIG. 3.

Figure 3:
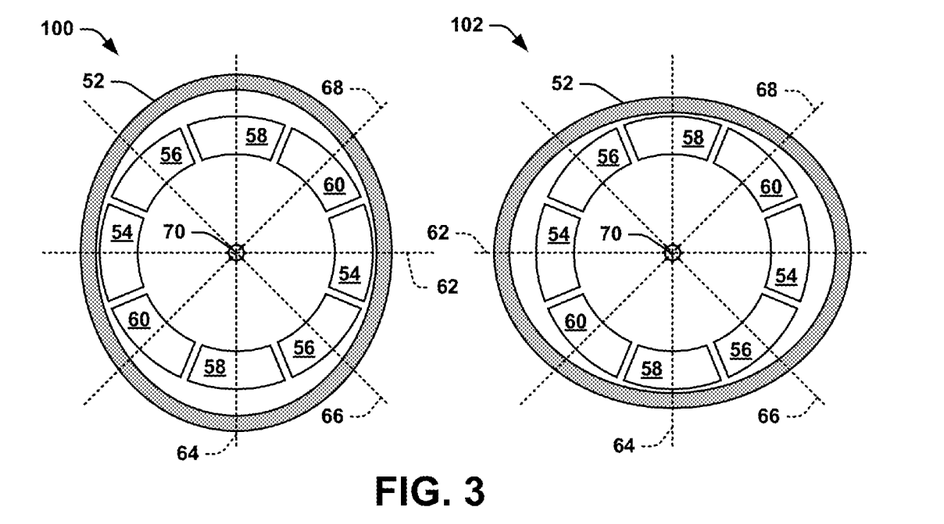
FIG. 3 illustrates an example diagram of periodic motion of a sensor.

The anti-nodal pickoff electrodes 58 can be configured to capacitively monitor the motion of the annular resonator 52 based on the changes in capacitance through the period of the drive axis forcer signal $SIG_{AN}$. The drive axis pickoff signal $PO_{AN}$ can thus be indicative of a magnitude of the motion of the annular resonator 52, and can thus be applied to the processor 22 (e.g., via the demodulation system 26), to maintain a substantially constant amplitude of the annular resonator 52 (i.e., peak maximum deformation along the anti-nodal axis 62) in each period of the drive axis forcer signal $SIG_{AN}$. The drive axis forcer signal $SIG_{AN}$ can thus provide the electrostatic force to alternate the motion of the annular resonator 52 between the state 100 and the state 102 in each period of the drive axis forcer signal $SIG_{AN}$. Accordingly, the signal generator 24 can maintain a substantially constant periodic motion of the annular resonator 52 at a frequency that is approximately equal to a resonant frequency of the annular resonator 52.

Due to process tolerance mismatches, the fabrication of the annular resonator 52 can result in the uneven distributions of material about the annular resonator 52. As a result, the annular resonator 52 can exhibit orthogonal principle elastic axes along which the annular resonator 52 has a substantial maximum and a substantial minimum resonant frequency, respectively, with respect to a nominal resonant frequency of the annular resonator 52 (e.g., at which the drive axis forcer signal $SIG_{AN}$ is applied). The principle elastic axes can be arbitrarily arranged with respect to the anti-nodal axes 62 and 64 and the nodal axes 66 and 68. The difference in the resonant frequency between the principle elastic axes can thus result in a quadrature effect acting upon the annular resonator 52 during the periodic motion of the annular resonator 52 that is responsive to the application of the drive axis forcer signal $SIG_{AN}$. As described herein, the term "quadrature effect(s)" refers to motion of the annular resonator 52 along the nodal axes 66 and 68 that is 90° out-of-phase with respect to the motion due to angular rate about the input axis during the periodic motion of the annular resonator 52 that is responsive to the application of the drive axis forcer signal $SIG_{AN}$.

The sense axis nodal force-rebalance electrodes 56 are each provided a sense axis force-rebalance signal $SIG_N$, with the signal being provided at approximately the resonant frequency of the annular resonator 52. The sense axis force-rebalance signal $SIG_N$ can include a bias component and rate component that are arranged approximately 90° out-of-phase with respect to the quadrature component, with the rate and bias components being approximately in-phase with the drive axis forcer signal $SIG_{AN}$. In response, the sense axis nodal force-rebalance electrodes 56 can provide an electrostatic force that acts upon the annular resonator 52 to force-rebalance the annular resonator 52 to substantially counteract the motion resulting from quadrature effects and to counteract motion resulting from bias and rotation of the CVG sensor system 50 about the input axis 70. In response, the annular resonator 52 is attracted to sense axis nodal force-rebalance electrodes 56 substantially equally and oppositely along the nodal force-rebalance axis 66.

The magnitude of force-rebalance necessary to substantially cancel the bias, angular rate, and quadrature effects can be determined by the processor 22 based on the sense axis pickoff signal $PO_N$ (e.g., via the demodulation system 26). For example, nodal pickoff electrodes 60 can be configured to capacitively monitor the motion of the annular resonator 52 based on the changes in capacitance through the period of the nodal force-rebalance $SIG_N$. The sense axis pickoff signal $PO_N$ can thus be demodulated to provide a bias and rate component and a quadrature component, such that the rate component is indicative of the bias and angular rotation of the sensor system 50 about the input axis and the quadrature component is indicative of a magnitude of the quadrature effects acting upon the annular resonator 52. The nodal pickoff signal $PO_N$ can thus be provided to the processor 22 (e.g., via the demodulation system 26), to substantially cancel the motion caused by the bias, angular rotation of the sensor system 50 about the input axis 70 and quadrature effects.

Referring back to the example of FIG. 1, the gyroscope controller 14 also includes a phase controller 28. As described previously, the rate and bias components and the quadrature component are arranged approximately 90° out-of-phase of each other, with the rate and bias components being approximately in-phase with the drive axis forcer signal $SIG_{AN}$. As an example, the bias and rate component and the quadrature component can be modulated via a cosine signal and a sine signal, respectively. However, a slight phase error in the sine and cosine modulation can result in cross-coupling of the quadrature component and the rate component, which can result in errors associated with the measurement of the angular rate of rotation of the sensor system 50 about the input axis 70. For example, the coupling of the quadrature component into the rate component can result in bias error in the measurement of the rate of angular rotation of the sensor system 50 about the input axis 70. Additionally, the coupling of the rate component into the quadrature component can result in scale factor errors in the measurement of the rate of angular rotation of the sensor system 50 about the input axis 70. Accordingly, the phase controller 28 can be configured to adjust the modulation phase of the quadrature component and bias and rate component of the sense axis force-rebalance signal $SIG_N$ to substantially mitigate cross-coupling of the quadrature component and the rate component of the sense axis force-rebalance signal $SIG_N$.

As an example, as described previously, the signal generator 24 can be configured to modulate a predetermined disturbance signal component onto the quadrature component of the sense axis force-rebalance signal $SIG_N$. The demodulator system 26 can thus demodulate the nodal pickoff signal $PO_N$ into a quadrature component and a rate component (e.g., at a frequency corresponding to the resonant frequency of the annular resonator 16). The demodulator system 26 can then demodulate the rate component at approximately the frequency of the predetermined disturbance signal to determine if the predetermined disturbance signal component is present in the rate component of the force-rebalance signal $SIG_N$. If the predetermined disturbance signal component is detected in the rate component of the force-rebalance signal $SIG_N$, then it is indicative of the coupling of the quadrature component of the sense axis force-rebalance signal $SIG_N$ into the rate component of the sense axis force-rebalance signal $SIG_N$. Accordingly, the phase controller 28 can adjust the phase of the modulation of the quadrature component and the rate component in generating the sense axis nodal force-rebalance $SIG_N$ via the signal generator 24, such as continuously until the predetermined disturbance signal component is no longer detected in the rate component of the sense axis force-rebalance signal $SIG_N$. As a result, the measurement of the angular rate of rotation ROT can be provided such that errors resulting from the cross-coupling of the quadrature component and the rate component are substantially mitigated.

Figure 4:
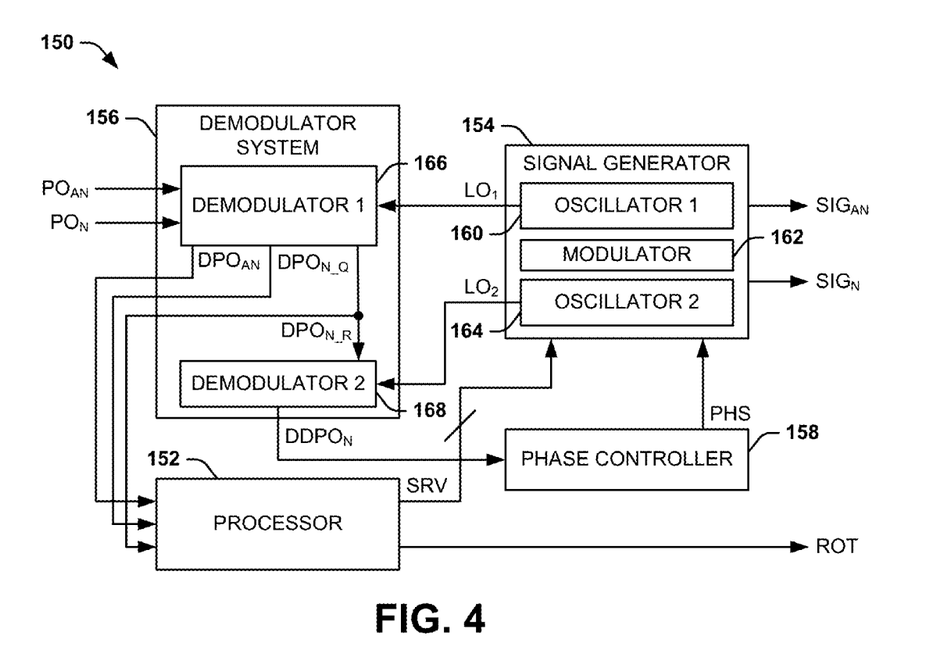
FIG. 4 illustrates an example of a gyroscope controller.

FIG. 4 illustrates an example of a gyroscope controller 150. The gyroscope controller 150 can correspond to the gyroscope controller 14 in the example of FIG. 1. Therefore, reference is to be made to the example of FIG. 1, as well as FIGS. 2 and 3, in the following description of the example of FIG. 4.

The gyroscope controller 150 includes a processor 152, a signal generator 154, a demodulator system 156, and a phase controller 158. The signal generator 154 is configured to generate the drive axis forcer signal $SIG_{AN}$ that is provided to a first set of forcer electrodes (e.g., the forcer electrodes 54) based on the anti-nodal pickoff signal $PO_{AN}$, and to generate the sense axis force-rebalance signal $SIG_N$ that is provided to a second set of forcer electrodes (e.g., the forcer electrodes 56) based on the nodal pickoff signal $PO_N$. In the example of FIG. 4, the signal generator 154 includes a first oscillator 160 and a modulator 162. The first oscillator 160 is configured as a phase-locked-loop to generate a first signal $LO_1$ having a first frequency corresponding approximately to the resonant frequency of the annular resonator (e.g., the annular resonator 52). Therefore, the signal generator 154 can be configured to generate both the drive axis forcer signal $SIG_{AN}$ and the nodal force-rebalance signal $SIG_N$ as respectively modulated via the modulator 162 based on the respective pickoff signals $PO_{AN}$ and $PO_N$.

The signal generator 154 also includes a second oscillator 164 that is configured to generate a second signal $LO_2$ having a second frequency (e.g., a random frequency) that can be in a range less than the first frequency (e.g., approximately 300-500 Hz). The second frequency can correspond to the frequency of the predetermined disturbance signal component. As an example, the sense axis force-rebalance signal $SIG_N$ can include a bias and rate component and a quadrature component. The modulator 162 can thus also be configured to modulate the quadrature component with the second signal $LO_2$ prior to modulation with the first signal $LO_1$. Therefore, the quadrature component can be modulated with the second signal $LO_2$ first, and then the modulated quadrature component can be modulated with the first signal $LO_1$. As an example, the modulated quadrature component can be modulated by a sine signal based on the first signal $LO_1$ and the rate component can be modulated by a cosine signal based on the first signal $LO_1$, such that the modulated rate component and the modulated quadrature component are out-of-phase with respect to each other by approximately 90°, with the rate component being approximately in-phase with the drive axis forcer signal $SIG_{AN}$. The signal generator 154 can be configured to generate the sense axis force-rebalance signal $SIG_N$ by adding the modulated rate component and the twice-modulated quadrature component, such as digitally before converting the summed signal to a digital-to-analog converter (DAC) to provide the sense axis force-rebalance signal $SIG_N$ as a voltage signal.

The demodulator system 156 can be configured to receive the drive axis pickoff signal $PO_{AN}$, such as provided from the anti-nodal pickoff electrodes 58, and the sense axis pickoff signal $PO_N$, such as provided from the nodal pickoff electrodes 60. The demodulator system 156 includes a first demodulator 166 that is configured to demodulate the drive axis pickoff signal $PO_{AN}$ and the sense axis pickoff signal $PO_N$ via the first signal $LO_1$. Thus, the drive axis pickoff signal $PO_{AN}$ and the sense axis pickoff signal $PO_N$ are each demodulated separately at a frequency that is approximately equal to the resonant frequency of the annular resonator. The first demodulator 166 is configured to provide a demodulated drive axis pickoff signal $DPO_{AN}$ and an intermediate signal formed by two pickoff signal components: a rate component $DPO_{N\_R}$ and a quadrature component $DPO_{N\_Q}$. As an example, the sense axis pickoff signal $PO_N$ can be demodulated by a cosine signal based on the first signal $LO_1$ to provide the rate component $DPO_{N\_R}$, and can be demodulated by a sine signal based on the first signal $LO_1$ to provide the quadrature component $DPO_{N\_Q}$. Therefore, the rate component $DPO_{N\_R}$ and the quadrature component $DPO_{N\_Q}$ can correspond to the components of the rate component and the quadrature component, respectively, of the sense axis force-rebalance signal $SIG_N$.

The processor 152 is configured to receive the demodulated drive axis pickoff signal $DPO_{AN}$, as well as the rate component $DPO_{N\_R}$ and the quadrature component $DPO_{N\_Q}$. In response, the processor 152 is configured to generate instructions regarding force-rebalancing of the annular resonator, demonstrated as a set of one or more signals SRV. The signal(s) SRV can provide data regarding an amplitude of the drive axis forcer signal $SIG_{AN}$ (e.g., via the demodulated drive axis pickoff signal $DPO_{AN}$), such that the signal generator 154 can be configured to generate the drive axis forcer signal $SIG_{AN}$ based on the signal(s) SRV. As another example, the signal(s) SRV can provide data regarding a magnitude of force-rebalance required to substantially null the deformation of the annular resonator resulting from the angular rotation of the sensor system (e.g., the sensor system 50, via the rate component $DPO_{N\_R}$) and/or the deformation of the annular resonator resulting from quadrature effects (e.g., via the quadrature component $DPO_{N\_Q}$), such that the signal generator 154 can be configured to generate the sense axis force-rebalance signal $SIG_N$ based on the signal(s) SRV. Additionally, the processor 152 can be configured to calculate the angular rate of rotation of the sensor system based on the rate component $DPO_{N\_R}$ to generate the signal ROT corresponding to the bias and angular rate of rotation of the sensor system.

The demodulator system 156 also includes a second demodulator 168 configured to demodulate the rate component $DPO_{N\_R}$ via the second signal $LO_2$. Thus, the rate component $DPO_{N\_R}$ is demodulated \at a frequency that is approximately equal to the frequency of the predetermined disturbance signal component. The second demodulator 168 is configured to provide a demodulated rate component pickoff signal $DDPO_{N\_R}$ that is provided to the phase controller 158. The phase controller 158 can be configured to detect whether the demodulated rate component pickoff signal $DDPO_{N\_R}$ includes the predetermined disturbance signal component, such as indicative of a cross-coupling of the rate component and the quadrature component in the sense axis force-rebalance signal $SIG_N$. As an example, the demodulated rate component pickoff signal $DDPO_{N\_R}$ can include a polarity that is indicative of a polarity of phase error with respect to the rate component and the quadrature component in the sense axis force-rebalance signal $SIG_N$. Accordingly, in response to detecting the presence of the predetermined disturbance signal component in the demodulated rate component pickoff signal $DDPO_{N\_R}$, the phase controller 158 can be configured to provide a signal PHS to the signal generator 154 that is indicative of the polarity of the phase error. As a result, the signal generator 154 can be configured to incrementally adjust the phase of the quadrature component positively or negatively relative to the modulation phase of the rate and quadrature components of the sense axis force-rebalance signal $SIG_N$ based on a polarity of the demodulated rate component pickoff signal $DDPO_{N\_R}$. Thus, the phase controller 158 can provide iterative corrections to the phase of the quadrature component relative to the rate component until the predetermined disturbance signal component is not detected in the demodulated rate component pickoff signal $DDPO_{N\_R}$. Additionally, in response to the phase controller 158 not detecting the predetermined disturbance signal component in the demodulated rate component pickoff signal $DDPO_{N\_R}$, the phase controller 158 can maintain the modulation phase of the quadrature component and the rate component, such as to maintain a substantial mitigation of the errors in the measurement of the angular rate of rotation of the sensor system, as provided by the signal ROT.

Figure 5:
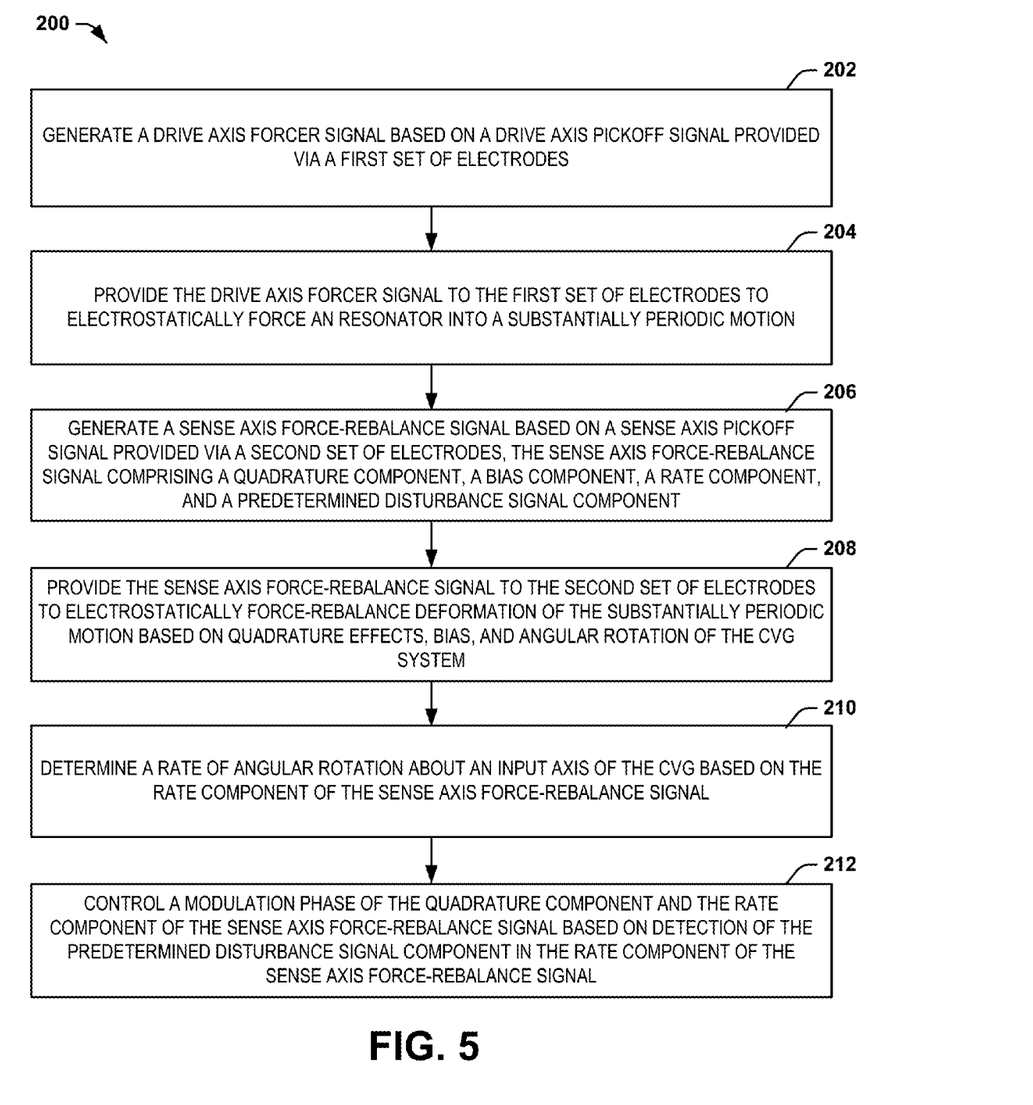
FIG. 5 illustrates an example of a method for substantially mitigating bias and scale-factor errors in a CVG system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for substantially mitigating bias and scale-factor errors in a CVG system (e.g., the CVG system 10). At 202, a drive axis forcer signal (e.g., the drive axis forcer signal $SIG_{AN}$) is generated based on a drive axis pickoff signal (e.g., the drive axis pickoff signal $PO_{AN}$) provided via a first set of electrodes (e.g., the electrodes 58). At 204, the drive axis forcer signal is provided to the first set of electrodes (e.g., the electrodes 54) to electrostatically force a resonator (e.g., the annular resonator 16) into a substantially periodic motion. At 206, a sense axis force-rebalance signal (e.g., the sense axis force-rebalance signal $SIG_N$) is generated based on a sense axis pickoff signal (e.g., the sense axis pickoff signal $PO_N$) provided via a second set of electrodes (e.g., the electrodes 60), the sense axis force-rebalance signal comprising a quadrature component, a bias component, a rate component, and a predetermined disturbance signal component. At 208, the sense axis force-rebalance signal is provided to the second set of electrodes (e.g., the electrodes 56) to electrostatically force-rebalance deformation of the substantially periodic motion based on bias, quadrature effects, and angular rotation of the CVG system. At 210, a rate of angular rotation about an input axis of the CVG is determined based on the rate component of the sense axis pickoff signal. At 212, a modulation phase of the quadrature component and the rate component of the sense axis force-rebalance signal is controlled based on detection of the predetermined disturbance signal component in the rate component of the sense axis pickoff signal (e.g., the phase controller 168).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Coriolis vibratory gyroscope (CVG) system comprising:
    a sensor system comprising a plurality of electrodes configured to electrostatically force a resonator into a substantially periodic motion based on a drive axis forcer signal applied to a first set of the plurality of electrodes and a sense axis force-rebalance signal applied to a second set of the plurality of electrodes, and configured to provide a sense axis pickoff signal and a drive axis pickoff signal; and
    a gyroscope controller configured to generate the drive axis forcer signal based on the drive axis pickoff signal and to calculate an angular rate of rotation of the CVG system about an input axis based on the sense axis force-rebalance signal, the gyroscope controller being further configured to modulate a predetermined disturbance signal component onto the sense axis force-rebalance signal and to control a modulation phase of the sense axis force-rebalance signal based on detection of the predetermined disturbance signal component in the sense axis force-rebalance signal to substantially mitigate bias and scale-factor error.

2. The system of claim 1, wherein the gyroscope controller is further configured to provide the drive axis forcer signal and the sense axis force-rebalance signal at a first frequency that is approximately equal to a resonant frequency associated with the resonator, the gyroscope controller comprising a demodulator configured to demodulate the sense axis pickoff signal to generate a rate intermediate signal and a quadrature intermediate signal, wherein the gyroscope controller is further configured to modulate the rate and quadrature intermediate signals at the first frequency and to combine the rate and quadrature intermediate signals to generate the sense axis force-rebalance signal.

3. The system of claim 2, wherein the gyroscope controller comprises a signal generator configured to modulate the quadrature intermediate signal with a sine signal to generate a first signal component, to modulate the rate intermediate signal with a cosine signal to generate a second signal component, and to add the first and second signal components together to generate the sense axis force-rebalance signal.

4. The system of claim 3, wherein the gyroscope controller is configured to amplitude-modulate the predetermined disturbance signal component into the first signal component of the sense axis force-rebalance signal.

5. The system of claim 1, wherein the sense axis force-rebalance signal comprises a rate component configured to force-rebalance the bias and the angular rate of rotation of the CVG system about the input axis and a quadrature component configured to force-rebalance the resonator in response to quadrature effects, wherein the predetermined disturbance signal component is modulated onto the quadrature component.

6. The system of claim 5, wherein the gyroscope controller comprises:
a demodulator configured to demodulate the sense axis pickoff signal to detect the predetermined disturbance signal component; and
a phase controller configured to adjust a modulation phase of the quadrature component and the rate component in response to detecting the predetermined disturbance signal component in the rate component of the sense axis force-rebalance signal to substantially mitigate bias and scale-factor error due to cross-coupling of a quadrature force-rebalance signal and the rate component of the sense axis force-rebalance signal.

7. The system of claim 6, wherein the demodulator comprises:
a first demodulator configured to demodulate the sense axis pickoff signal at a first frequency to generate an intermediate signal that corresponds to the angular rate of rotation; and
a second demodulator configured to demodulate the intermediate signal at a second frequency to detect the predetermined disturbance signal component.

8. The system of claim 7, wherein the phase controller is configured to incrementally adjust the modulation phase of the quadrature component and the rate component based on a magnitude and a polarity of the demodulated intermediate signal.

9. The system of claim 1, wherein the plurality of electrodes comprises:
a first set of electrodes configured to maintain the periodic motion of the resonator; and
a second set of electrodes configured to substantially measure quadrature effects, bias, and the angular rate of rotation of the CVG system about the input axis.

10. The system of claim 9, wherein the first set of electrodes comprises:
an oppositely-disposed pair of drive axis forcer electrodes configured to generate an electrostatic force based on the drive axis forcer signal to electrostatically force the resonator into the substantially periodic motion; and
an oppositely-disposed pair of drive pickoff electrodes arranged orthogonally with respect to the drive axis forcer electrodes and being configured to generate the drive axis pickoff signal;
and wherein the second set of electrodes comprises:
an oppositely-disposed pair of sense axis forcer electrodes arranged 45° with respect to the drive axis forcer electrodes and being configured to generate an electrostatic force based on the sense axis force-rebalance signal to electrostatically force-rebalance deformation of the substantially periodic motion based on quadrature effects, bias, and the angular rate of rotation; and
an oppositely-disposed pair of quadrature pickoff electrodes arranged orthogonally with respect to the sense axis forcer electrodes and being configured to generate the sense axis pickoff signal.

11. A method for substantially mitigating bias and scale-factor errors in a Coriolis vibratory gyroscope (CVG) system, the method comprising:
generating a drive axis forcer signal based on a drive axis pickoff signal provided via a first set of electrodes;
providing the drive axis forcer signal to the first set of electrodes to electrostatically force a resonator into a substantially periodic motion;
generating a sense axis force-rebalance signal based on a sense axis pickoff signal provided via a second set of electrodes, the sense axis force-rebalance signal comprising a quadrature component, a bias component, a rate component, and a predetermined disturbance signal component;
providing the sense axis force-rebalance signal to the second set of electrodes to electrostatically force-rebalance deformation of the substantially periodic motion based on quadrature effects, bias, and angular rotation of the CVG system;
determining a rate of angular rotation about an input axis of the CVG based on the rate component of the sense axis force-rebalance signal; and
controlling a modulation phase of the quadrature component and the rate component of the sense axis force-rebalance signal based on detection of the predetermined disturbance signal component in the rate component of the sense axis force-rebalance signal.

12. The method of claim 11, wherein generating the drive axis forcer signal and generating the sense axis force-rebalance signal comprises generating the drive and sense axis force-rebalance signals at a first frequency that is approximately equal to a resonant frequency associated with the resonator, the method comprising generating the predetermined disturbance signal component at a second frequency that is less than the first frequency.

13. The method of claim 11, wherein generating the sense axis force-rebalance signal comprises:
demodulating the sense axis pickoff signal to generate an intermediate signal comprising a quadrature component and a rate and bias component;

amplitude modulating the predetermined disturbance signal component onto the quadrature component to generate a modified quadrature component; and modulating the modified quadrature component and the rate component to generate the sense axis force-rebalance signal.

14. The method of claim 13, wherein modulating the modified quadrature component and the rate component comprises:

modulating the modified quadrature component with a sine signal to generate a first signal component;

modulating the rate component with a cosine signal to generate a second signal component; and adding the first and second signal components together to generate the sense axis force-rebalance signal.

15. The method of claim 13, wherein demodulating the sense axis pickoff signal comprises demodulating the sense axis pickoff signal at a first frequency to generate the intermediate signal, wherein the rate component comprises an amplitude that corresponds to the bias and angular rate of rotation, the method further comprising:

demodulating the rate component at a second frequency to detect the presence of the predetermined disturbance signal component;

incrementally adjusting the modulation phase of the quadrature component and the rate component based on a magnitude and polarity of the intermediate signal; and maintaining the modulation phase of the quadrature component and the rate component in response to not detecting the predetermined disturbance signal component in the rate component.

16. The method of claim 11, further comprising:

receiving the drive axis pickoff signal via an oppositely-disposed pair of drive pickoff electrodes; and receiving the sense axis pickoff signal via an oppositely-disposed pair of sense axis pickoff electrodes arranged 45° with respect to the drive pickoff electrodes; and wherein providing the drive axis forcer signal comprises providing the drive axis forcer signal to an oppositely-disposed pair of drive axis forcer electrodes arranged 90° with respect to the drive axis pickoff electrodes; and wherein providing the sense axis force rebalance signal comprises providing the sense axis force rebalance signal to an oppositely-disposed pair of sense axis force rebalance electrodes arranged orthogonally with respect to the sense axis pickoff electrodes.

17. A Coriolis vibratory gyroscope (CVG) system comprising:

a sensor system comprising a plurality of electrodes configured to electrostatically force a resonator into a substantially periodic motion based on a drive axis forcer signal and a sense axis force-rebalance signal, the sense axis force-rebalance signal comprising bias component, a rate component, and a quadrature component, and configured to provide a sense axis pickoff signal and a drive axis pickoff signal; and a gyroscope controller comprising:

a signal generator configured to generate the drive axis forcer signal and the sense axis force-rebalance signal each at a first frequency and a predetermined disturbance signal component at a second frequency less than the first frequency, and to modulate the predetermined disturbance signal component onto the quadrature component of the sense axis force-rebalance signal;

at least one demodulator configured to demodulate the sense axis pickoff signal and the drive axis pickoff signal;

a processor configured to calculate an angular rate of rotation of the CVG system about an input axis based on the rate component of the sense axis force-rebalance signal; and a phase controller configured to detect a modulation phase error of the rate component and the quadrature component of the sense axis force-rebalance signal based on detection of the predetermined disturbance signal component in a demodulated rate component of the sense axis force-rebalance signal and to adjust a modulation phase of the rate component and the quadrature component to substantially mitigate bias and scale-factor errors.

18. The system of claim 17, wherein the phase controller is configured to maintain the modulation phase of the rate component and the quadrature component of the sense axis force-rebalance signal in response to not detecting the predetermined disturbance signal component in the demodulated rate component of the sense axis force-rebalance signal.

19. The system of claim 17, wherein the at least one demodulator comprises:

a first demodulator configured to demodulate the sense axis pickoff signal at a first frequency to generate an intermediate signal comprising a rate component and a quadrature component, the rate component having an amplitude that corresponds to a bias and the angular rate of rotation; and a second demodulator configured to demodulate the rate component at a second frequency to detect the predetermined disturbance signal component.

20. The system of claim 19, wherein the phase controller is configured to incrementally adjust the modulation phase of the rate component and the quadrature component.

* * * * *